United States Patent [19]

Kuchenbecker

[11] E Patent Number: Re. 32,902

[45] Reissued Date of Patent: Apr. 11, 1989

[54] CARTON WITH IMPROVED OPENING STRUCTURE

[75] Inventor: Morris W. Kuchenbecker, Neenah, Wis.

[73] Assignee: James River Norwalk, Inc., Norwalk, Conn.

[21] Appl. No.: 87,262

[22] Filed: Aug. 20, 1987

Related U.S. Patent Documents

Reissue of:

[64] Patent No.: 4,538,732
Issued: Sep. 3, 1985
Appl. No.: 489,131
Filed: Apr. 27, 1983

U.S. Applications:

[63] Continuation of Ser. No. 274,790, Jun. 18, 1981, abandoned.

[51] Int. Cl.[4] ..... B65D 5/70

[52] U.S. Cl. ..... 206/613; 206/628; 229/125.05; 229/160.2; 426/113; 426/122

[58] Field of Search ..... 206/605-615, 206/622, 624, 625, 628, 629, 45.12, 45.2-45.26; 229/30, 33, 34 B, DIG. 11, 16 A, 16 D; 225/48; 248/152, 174, 359; 426/113, 122

[56] References Cited

U.S. PATENT DOCUMENTS

| | | | |
|---|---|---|---|
| 2,143,940 | 1/1939 | Craig et al. | 206/605 |
| 2,218,509 | 10/1940 | Goodyear | 206/611 |
| 3,065,896 | 11/1962 | Grapp | 206/611 |
| 3,096,914 | 7/1963 | Van Dyke et al. | 225/48 |
| 3,108,735 | 10/1963 | Meyers | 206/611 |
| 3,239,128 | 3/1966 | Rumberger | 206/613 X |
| 3,298,595 | 1/1967 | Collura | 206/608 X |
| 3,491,937 | 1/1970 | Brastad | 229/51 |
| 3,580,483 | 5/1971 | Young | 206/613 X |
| 3,708,104 | 1/1973 | Buttery | 206/608 |
| 3,724,741 | 4/1973 | Jacobsen | 229/38 |
| 3,758,023 | 9/1973 | Meyers | 206/624 X |
| 3,786,983 | 1/1974 | Hennessey | 206/628 X |
| 3,833,165 | 9/1974 | Hoiles | 206/624 X |
| 3,981,434 | 9/1976 | Ramich | 229/16 A |
| 4,049,190 | 9/1977 | O'Neill | 206/611 |
| 4,083,454 | 4/1978 | O'Neill | 206/605 |
| 4,096,948 | 6/1978 | Kuchenbecker | 206/622 |
| 4,102,457 | 7/1978 | Meyers | 206/611 |

*Primary Examiner*—David T. Fidei
*Assistant Examiner*—Bryon Gehman
*Attorney, Agent, or Firm*—Richard J. Gallagher

[57] ABSTRACT

Tear strip structure for the relatively narrow side wall of a relatively flat rectangular paperboard carton. The side wall is defined by an inner folded closure flap and an outer flap folded thereover. The outer flap has a line of weakness extending along its length, between and parallel to its fold line and its free edge. The inner flap has a first cut score line defining its fold line and a second cut score line [coincident] *aligned* with the line of weakness of the outer flap. The region of the outer flap overlying the region of the inner flap between the cut score lines is adherent to the latter region and defines a tear strip, an end portion of which is non-adherent and functions as a tab by which the strip may be grasped and torn away, separating the plies of the underlying closure flap between the cut score lines in achievement of removal of the tear strip in predictable, controlled manner.

6 Claims, 2 Drawing Sheets

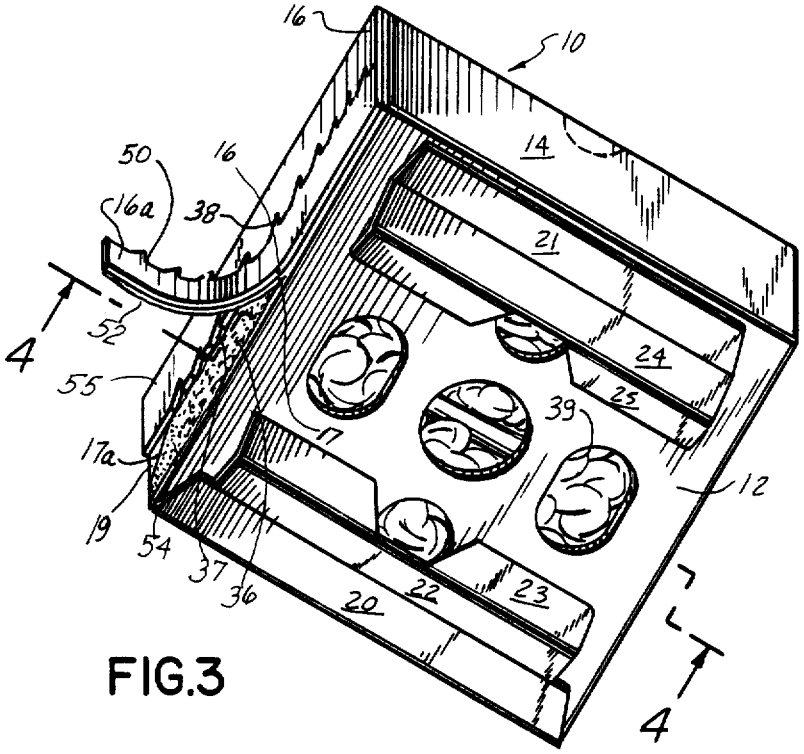
FIG.3
FIG.4
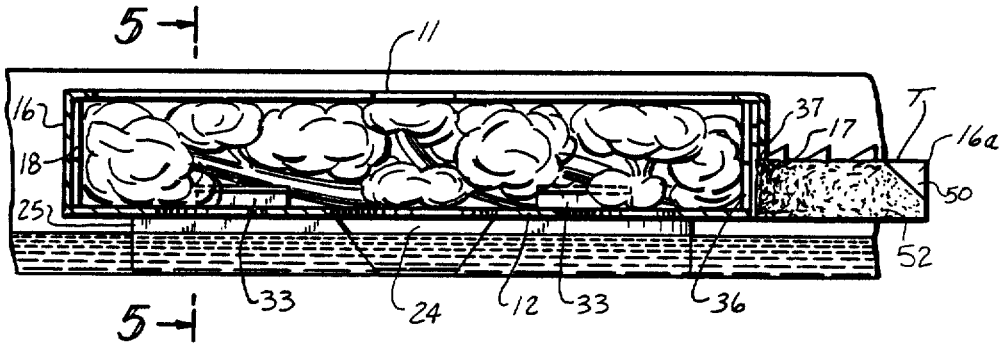
FIG.5
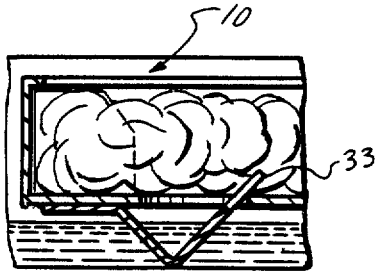

CARTON WITH IMPROVED OPENING STRUCTURE

Matter enclosed in heavy brackets [ ] appears in the original patent but forms no part of this reissue specification; matter printed in italics indicates the additions made by reissue.

This is a continuation of application Ser. No. 274,790, filed June 18, 1981, *now abandoned.*

BACKGROUND OF THE INVENTION

This invention relates to cartons, and more particularly to an improved opening flap structure for the side wall of a relatively flat paperboard carton.

Cartons of the hereinabove briefly described type have relatively narrow side walls closed by folded flaps that include means for opening the carton to provide access to its contents. One such closure flap structure is disclosed in my U.S. Pat. No. 4,096,948, issued June 27, 1978, and assigned to the assignee of the present invention. In the referenced closure flap structure, one flap overlies and is adhered to the other. The overlying flap is hingedly joined by a weakened hinge line to a carton wall panel. Tearing the overlying flap is achieved by grasping one end of the flap and pulling it to tear it from the adherent underlying flap and along the weakened hinge line. Tearing from the adhesive is random as between the outer and inner flaps.

Provinding an improved easy opening zipper structure for such a carton has proven difficult, since the flaps have been found to be too narrow for inclusion of a standard double herringbone zipper requiring substantial width. In narrow cartons there is insufficient space on a closure flap to incorporate both the double herringbone structure, i.e., lines of weakness on both sides of the tear strip, and means for effectively sealing the flaps.

It is a general objective of the present invention to provide an easily removable tear strip for opening the relatively narrow side wall of a flat carton.

It is a further objective of the invention to provide a tear strip for a relatively narrow wall of a paperboard container, wherein the strip is removable in predictable controlled manner.

SUMMARY OF THE INVENTION

In achievement of the foregoing as well as other general objectives, the invention contemplates improved tear strip structure for the relatively narrow side wall of a relatively flat paperboard carton, wherein the side wall is defined by an inner folded closure flap and an outer closure flap folded thereover, the outer flap having a line of weakness extending along its length, between and parallel to its fold line and its free edge. The inner flap has a first cut score defining its fold line, and a second cut score along a line [coincident] *aligned* with the line of weakness of the outer flap. The region of the outer flap overlying the region of the inner flap between the cut score lines is adherent to the latter region and defines a tear strip, an end portion of which is non-adherent and functions as a tab by which the strip may be grasped and torn away, delamination by separating the plies of the underlying closure flap between the cut score lines in achievement of removal of the strip in predictable, controlled manner.

The manner in which the foregoing as well as other objectives and advantages of the invention may best be achieved will be more fully understood from a consideration of the following description, taken in light of the accompanying drawing.

BRIEF DESCRIPTION OF THE DRAWING

FIG. 3 is a perspective view of the carton showing the tear strip partially removed;

FIG. 4 is a section taken along line 4—4 in FIG. 3; and

FIG. 5 is a section taken along line 5—5 in FIG. 4.

DESCRIPTION OF THE PREFERRED EMBODIMENT

Figure 1:
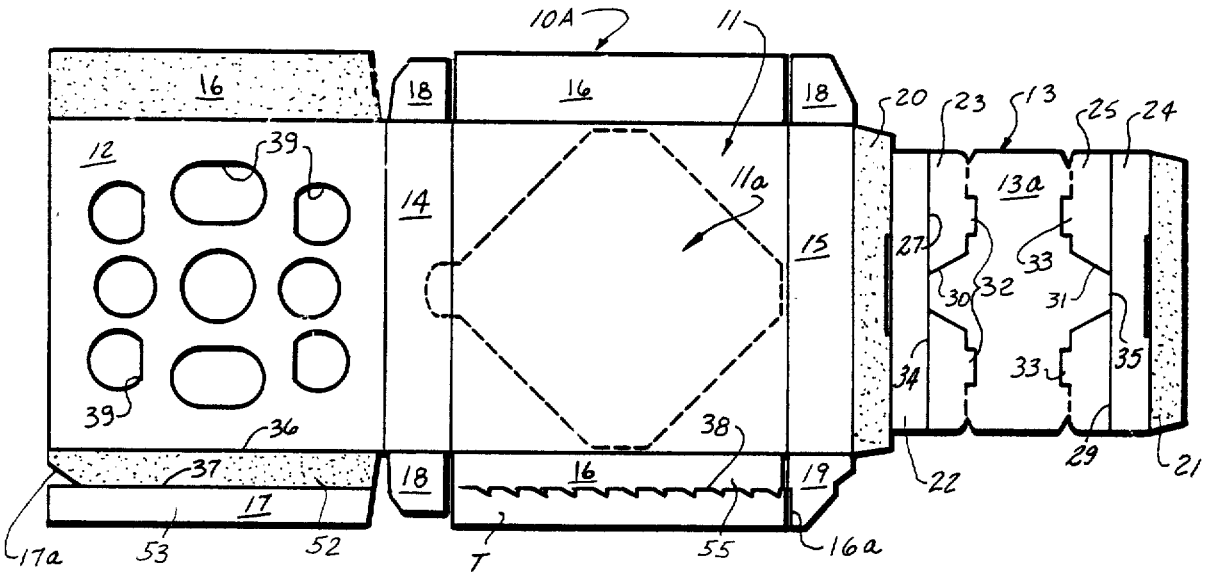
FIG. 1 is a plan view of the blank from which the relatively flat carton embodying the present invention is constructed.

With more detailed reference to the drawing, and first to FIG. 1, a blank 10A for a relatively narrow-sided rectangular carton 10, typically about 7/8 inch high, to be described in detail in the remaining Figures and embodying elements of the improved tear strip structure contemplated by the present invention, includes a top panel 11 hingedly joined to panels 12 and 13 through relatively narrow side panels 14 and 15. The blank further includes hingedly connected end closure flaps 16,17 and closure tabs 18, 19. Blank 10A preferably is made of paperboard coated on both sides with low density polyethylene (LDPE).

Panel 13 includes a pair of glue flaps 20 and 21, connected to a central panel portion 13a through folding panels 22, 23 and 24, 25. Further to the construction of central panel portion 13a, lines of weakness are so configured as to be mirror images of one another, including closely spaced offset parallel sections that form small lugs 32, 33 in respective panels 23 and 24, and widely spaced elongate cut sections 34, 35 coincident with score lines 27 and 29, respectively.

Further to construction of the blank, the lower end flaps 16 and 17, as viewed in FIG. 1, are to cooperate with one another in the set-up mode of the carton, and with closure flaps 18 and 19 adjacent thereto, to serve as the means for opening the carton. In provision of the opening feature to which the present invention is directed, end flap 17 is hingedly connected along a cut score line 36 to panel 12, and includes a cut score line 37 parallel to cut score line 36 and spaced therefrom toward the free edge of the flaps. Both cut score lines 36 and 37 are on the surface opposite to the one viewed in FIG. 1. A line of weakness 38 in flap 16 is aligned with cut score line 37. For reasons also to be more fully appreciated from the set up mode of the carton to be described hereinbelow, the left end of flap 17 includes a notch 17a, preferably of generally V-shape, that extends between cut scores line 36 and 37. In the preferred embodiment, V-shaped notch 17a has its one leg substantially aligned with cut score line 37 and its other leg, extending at about 45° to the one leg, intersecting the end of inner flap 17 at a point closely spaced, for example about 3/16 inch, from cut score line 36. It has been found that a notch 17a of such shape and disposition ensures initiation of ply separation in the narrow region of the end flap 17, between the angular leg of the notch and cut score line 36.

Essentially completing the blank is a pattern of apertures 39, in a generally square array, wherein the corner apertures 39 are generally D-shaped and aligned with lugs 32 and 33 for reasons to be more fully explained hereinbelow in connection with one contemplated use of the carton.

Figure 2:
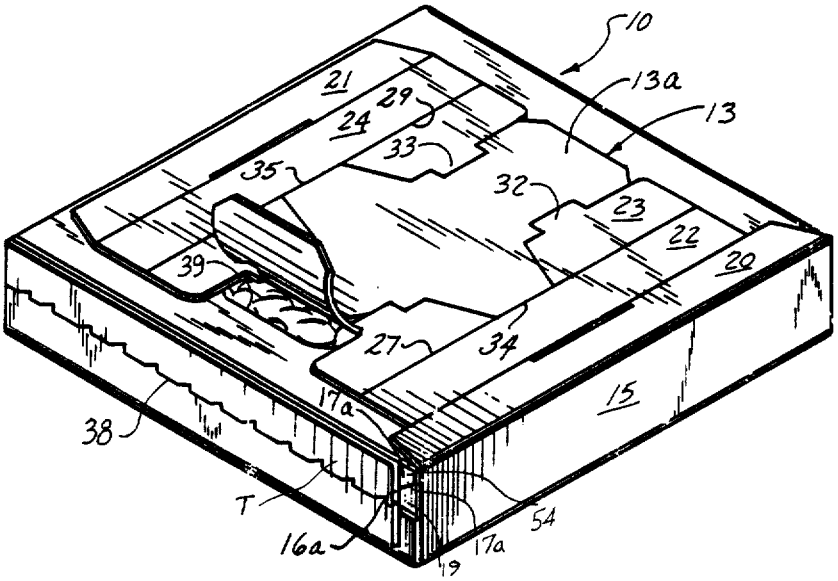
FIG. 2 is a perspective view of a set-up carton embodying the improved tear strip of the invention.

Turning now to FIG. 2, carton 10 has been formed from blank 10A, and using panel 11 as a reference, by folding side panels 14 and 15 vertically, at right angles to panel 11, followed by folding panel 12 on side panel 14 to a position confronting and parallel to panel 11. Panel 13 is then folded on side panel 15 to a position overlying panel 12 and glue tabs 20 and 21 are adhered to panel 12, in formation of a two-panel wall. With contents in place, closure tabs 18 and 19 are folded inwardly, flaps 16, 17 or panel 12 are folded over the tabs, and flaps 16 on panel 11 folded over and adhered to the underlying flaps 16, 17 in the hatched regions thereof (FIG. 1). Importantly, the cut score lines 36, 37 are preferably of the surface cut type and, in the set-up carton, both essentially face the outer flap 16. If desired, these cut score lines may be discontinuous along their lengths. The carton is complete at this stage and may be used as such. Additional modes of use will be explained hereinbelow, such as are afforded by the disclosed blank.

To facilitate removal of tear strip T on flap 16, and with reference to FIGS. 2, 3 and 4, in affording access to contents of the carton, the notch 17a underlies the strip a sufficient distance from its ends 16a to accommodate grasping the end and pulling the strip T away from the carton. FIG. 2 illustrates pivotation of end 16a away from the underlying flaps, and FIGS. 3 and 4 illustrate partial tearing of the strip T. As the strip T is pulled away, the underlying portion of flap 17 defined by cut score lines 36 and 37, and adherent to the strip, undergoes ply separation, allowing flaps 16 and 17 to pivot outwardly to open the carton.

Inner flap 17 delaminates a tear strip T is pulled away from the carton. Inner flap 17 has a first upper surface portion 52 bounded by the first and second cut score lines 36 and 37. In erecting the carton, tear strip T overlies and is bonded to first upper surface portion 52. Inner flap 17 also has a second upper surface portion 53 bounded by second cut score line 37 and the free edge of the inner flap. Second upper surface portion 53 underlies the nontear strip portion 55 of outer flap 16 in an unbonded condition. Inner flap 17 also has a lower surface portion 54 on the side opposite the first and second upper surface portions.

Since the upper surface portion 52 of inner flap 17 is adhesively bonded to tear strip T of outer flap 16, first upper surface portion 17 of inner flap 17 is lifted away from lower surface portion 54 of inner panel 17 by delamination. In other words, inner panel 17 delaminates into first upper surface 52 and the remaining parts of inner flap 17 including second upper surface portion 53 and lower surface portion 54. Both the first and second cut score lines 36 and 37 facilitate a clearly defined and even lamination of first surface portion 52 from the remaining portion of inner flap 17.

In one mode of use of the disclosed carton embodying the invention, and as disclosed and claimed in my copending application Ser. No. 274,803, filed June 18, 1981, and assigned to the assignee of the present invention, and with reference to FIGS. 2 and 3, of the present application central panel portion 13a of panel 13 may be grasped at one end and peeled away from the carton by tearing along lines of weakness 30 and 31. Panels 22 and 23 are then folded in accordion fashion, and lugs 32 are inserted in corner apertures 39 aligned therewith. Similarly, panels 24 and 25 are folded and lugs 33 are inserted in corner apertures 39 aligned therewith to lock the folded panels in place. The folded and locked panels then form legs which support the carton on a suitable surface, for heating of the contents. In this mode of use, the carton may be either opened by the improved tear strip of the present invention, or by a tear-out section 11a provided in panel 11 (FIG. 1).

It will be appreciated from the foregoing description that the improved tear strip structure may be embodied in flat paperboard cartons of the cook-in type or of the standard type from which contents are removed for preparation prior to use or for use directly. It will also be appreciated that the disclosed structure is but a single embodiment, and that modifications may be made within the scope of the appended claims.

I claim:

1. In a carton structure formed from paperboard characterized by inclusion of a relatively narrow wall portion to be opened in a controlled and predictable manner by tearing, the combination comprising:

relatively narrow inner and outer flaps folded in overlying relation and adhered to one another along their lengths in formation of said wall portion;

means defining a first cut score line along which said inner flap is folded to form an outside facing edge of the set up carton;

means defining a second cut score line in said inner flap parallel to and intermediate said first cut score line and the free edge of said inner flap;

said inner flap having a first upper surface portion bounded by said first and second cut score lines, a second upper surface portion bounded by said second cut score line and said free edge of said inner flap, said inner flap having a lower surface portion on the side opposite said first and second upper surface portions; the first upper surface portion of the inner flap being separable from the lower surface portion of the inner flap by delamination; and means defining a line of weakness in said outer flap [coincident with and overlying] *aligned with* said second cut score line, the recited adherence of said flaps to one another being in the region of the first upper surface portion between said cut score lines on said inner flap and between said line of weakness and the free edge of said outer flap;

said outer flap being graspable at one end thereof in a region between said line of weakness and the corresponding free edge portion, and adapted to be pulled away from the lower surface portion and the second surface portion of the underlying inner flap to effect separation of the first upper surface of the inner flap from the second surface portion along the second cut score line and from the lower surface portion between the first and second cut score lines by delamination, the first surface portion of the inner flap remaining adhered to the outer flap during the delamination of the inner flap between said cut score lines, said first cut score line for facilitating said delamination of said inner flap, whereby said carton is opened.

2. The carton structure of claim 1, wherein said first and second cut score lines are of the surface cut type and face said outer flap.

3. The carton surface of claim 1 or 2, wherein at least said relatively narrow wall portion is of generally rectangular configuration.

4. The carton structure of claim 1 or 2, wherein said inner and outer flaps are of substantially the same width.

5. The carton structure of claim 1 or 2, wherein said first cut score line is substantially coextensive with the free edge of said outer flap.

6. In a carton structure formed from paper board characterized by inclusion of a relatively narror wall portion to be opened in a controlled and predictable manner by tearing, the combination comprising:

relatively narrow inner and outer flaps folded in overlying relation and adhered to one another along their lengths in formation of said wall portion;

means defining a first cut score line along which said inner flap is folded to form an outside facing edge of the set up carton;

means defining a second cut score line in said inner flap parallel to and intermediate said first cut score line and the free edge of said inner flap;

said inner flap having a first upper surface portion bounded by said first and second cut score lines, a second upper surface portion bounded by said second cut score line and said free edge of said inner flap, said inner flap having a lower surface portion on the side opposite said first and second upper surface portions; the first upper surface portion of the inner flap being separable from the lower surface portion of the inner flap by delamination; and means defining a line of weakness in said outer flap [coincident with and overlying] *aligned with* said second cut score line, the recited adherence of said flaps to one another being in the region of the first upper surface portion between said cut score lines on said inner flap and between said line of weakness and the free edge of said outer flap;

said outer flap being graspable at one end thereof in a region between said line of weakness and the corresponding free edge portion, and adapted to be pulled away from the lower surface portion and the second surface portion of the underlying inner flap to effect separation of the first upper surface of the inner flap from the second surface portion along the second cut score line and from the lower surface portion between the first and second cut score lines by delamination, the first surface portion of the inner flap remaining adhered to the outer flap during the delamination of the inner flap between said cut score lines, said first cut score line for facilitating said delamination of said inner flap, whereby said carton is opened;

a notch disposed between said first and second cut score lines in one end of said inner flap, said notch being generally V-shaped and having one leg substantially aligned with said second score line and another leg intersecting the end of said inner flap at a point closely spaced from said first cut score line for ensuring initiation of delamination of said inner flap end in a region between said point and said first cut score line, said notch of the inner flap underlying said one end of said outer flap a sufficient distance from said one end of said outer flap to accommodate grasping said one end of said outer flap and pulling said outer flap away from said inner flap.

* * * * *